(12) United States Patent
Elliott

(10) Patent No.: US 7,551,892 B1
(45) Date of Patent: Jun. 23, 2009

(54) LOW-POWER AD HOC NETWORK ENTRY

(75) Inventor: Brig Barnum Elliott, Arlington, MA (US)

(73) Assignee: BBN Technologies Corp, Cambridge, MA (US)

( * ) Notice: Subject to any disclaimer, the term of this patent is extended or adjusted under 35 U.S.C. 154(b) by 692 days.

(21) Appl. No.: 10/786,288

(22) Filed: Feb. 26, 2004

(51) Int. Cl.
*H04B 5/00* (2006.01)

(52) U.S. Cl. .................. 455/41.1; 455/41.2; 455/68; 455/70

(58) Field of Classification Search ............ 455/41.1, 455/41.2, 68, 70, 522, 571
See application file for complete search history.

(56) References Cited

U.S. PATENT DOCUMENTS

| | | | |
|---|---|---|---|
| 4,964,121 A | 10/1990 | Moore | |
| 5,128,938 A | 7/1992 | Borras | |
| 5,203,020 A | 4/1993 | Sato et al. | |
| 5,301,225 A | 4/1994 | Suzuki et al. | |
| 5,430,731 A | 7/1995 | Umemoto et al. | |
| 5,583,866 A | 12/1996 | Vook et al. | |
| 5,590,396 A | 12/1996 | Henry | |
| 5,710,975 A * | 1/1998 | Bernhardt et al. | 340/7.22 |
| 5,790,946 A | 8/1998 | Rotzoll | |
| 5,987,024 A | 11/1999 | Duch et al. | |
| 6,016,322 A | 1/2000 | Goldman | |
| 6,052,779 A | 4/2000 | Jackson et al. | |
| 6,058,106 A | 5/2000 | Cudak et al. | |
| 6,104,708 A | 8/2000 | Bergamo | |
| 6,127,799 A | 10/2000 | Krishnan | |
| 6,192,230 B1 | 2/2001 | van Bokhorst et al. | |
| 6,208,247 B1 | 3/2001 | Agre et al. | |
| 6,243,579 B1 | 6/2001 | Kari et al. | |
| 6,292,508 B1 | 9/2001 | Hong et al. | |
| 6,374,311 B1 | 4/2002 | Mahany et al. | |
| 6,381,467 B1 | 4/2002 | Hill et al. | |
| 6,414,955 B1 | 7/2002 | Clare et al. | |
| 6,463,307 B1 | 10/2002 | Larsson et al. | |
| 6,473,607 B1 | 10/2002 | Shohara et al. | |
| 6,477,361 B1 | 11/2002 | LaGrotta et al. | |
| 6,512,935 B1 | 1/2003 | Redi | |
| 6,564,074 B2 | 5/2003 | Romans | |

(Continued)

OTHER PUBLICATIONS

Jim Rowson et al.; Everyday Problems and Always-On Radios; Berkeley Wireless Research Center; 11 pages.

(Continued)

*Primary Examiner*—Nay A Maung
*Assistant Examiner*—Tuan H Nguyen
(74) *Attorney, Agent, or Firm*—Ropes & Gray LLP

(57) ABSTRACT

A method, a node and an energy-conserving ad hoc network are provided that facilitate nodes joining the energy-conserving ad hoc network. A node includes a transceiver (210), a transmitter (206), and processing logic (202). The processing logic (202) is configured to control operation of the transceiver (210) and the transmitter (206). The processing logic (202) is further configured to transmit a wake-up signal via the transmitter (206) and receive a network entry message (600) from one of a group of existing nodes (101) in the network (100). The network entry message (600) includes scheduled times (620, 640) in which at least one of the existing nodes (101) in the network is available to receive. The processing logic (202) is further configured to join the network (100) based on the received scheduled times (620, 640).

3 Claims, 7 Drawing Sheets

U.S. PATENT DOCUMENTS

| | | |
|---|---|---|
| 6,574,269 B1 | 6/2003 | Bergamo |
| 6,583,675 B2 | 6/2003 | Gomez |
| 6,590,889 B1 | 7/2003 | Preuss et al. |
| 6,601,093 B1 | 7/2003 | Peters |
| 6,694,149 B1 | 2/2004 | Ady et al. |
| 6,714,983 B1 | 3/2004 | Koenck et al. |
| 6,745,027 B2 * | 6/2004 | Twitchell, Jr. ............ 455/422.1 |
| 6,760,584 B2 | 7/2004 | Jou |
| 6,791,949 B1 | 9/2004 | Ryu et al. |
| 6,859,135 B1 | 2/2005 | Elliott |
| 6,888,819 B1 | 5/2005 | Mushkin et al. |
| 6,894,975 B1 | 5/2005 | Partyka |
| 6,894,991 B2 | 5/2005 | Ayyagari et al. |
| 6,920,123 B1 | 7/2005 | Shin et al. |
| 6,981,052 B1 | 12/2005 | Cheriton |
| 7,020,501 B1 | 3/2006 | Elliott et al. |
| 7,027,392 B2 | 4/2006 | Holtzman et al. |
| 7,058,031 B2 * | 6/2006 | Bender et al. ............... 370/329 |
| 7,072,432 B2 | 7/2006 | Belcea |
| 7,103,344 B2 | 9/2006 | Menard |
| 7,110,783 B2 | 9/2006 | Bahl et al. |
| 7,142,520 B1 | 11/2006 | Haverinen et al. |
| 7,151,945 B2 | 12/2006 | Myles et al. |
| 7,155,263 B1 | 12/2006 | Bergamo |
| 7,209,771 B2 | 4/2007 | Twitchell, Jr. |
| 7,286,844 B1 | 10/2007 | Redi et al. |
| 2002/0067736 A1 * | 6/2002 | Garcia-Luna-Aceves et al. ............... 370/442 |
| 2002/0071395 A1 | 6/2002 | Redi et al. |
| 2002/0146985 A1 | 10/2002 | Naden |
| 2002/0147816 A1 | 10/2002 | Hlasny |
| 2003/0066090 A1 | 4/2003 | Traw et al. |
| 2003/0067892 A1 | 4/2003 | Beyer et al. |
| 2003/0099210 A1 | 5/2003 | O'Toole et al. |
| 2003/0114204 A1 | 6/2003 | Allen et al. |
| 2003/0115369 A1 | 6/2003 | Walter et al. |
| 2003/0119568 A1 | 6/2003 | Menard |
| 2003/0152110 A1 | 8/2003 | Rune |
| 2003/0185170 A1 | 10/2003 | Allen et al. |
| 2004/0077353 A1 | 4/2004 | Mahany |
| 2004/0125773 A1 | 7/2004 | Wilson et al. |
| 2004/0218580 A1 * | 11/2004 | Bahl et al. ................... 370/350 |
| 2004/0230638 A1 * | 11/2004 | Balachandran et al. ...... 709/200 |
| 2005/0009578 A1 * | 1/2005 | Liu ............................. 455/574 |
| 2005/0059347 A1 | 3/2005 | Haartsen |
| 2005/0152329 A1 | 7/2005 | Krishnan et al. |
| 2005/0185632 A1 | 8/2005 | Draves, Jr. et al. |
| 2005/0207376 A1 | 9/2005 | Ashwood-Smith et al. |
| 2005/0215280 A1 * | 9/2005 | Twitchell, Jr. ............ 455/553.1 |
| 2006/0007865 A1 | 1/2006 | White et al. |
| 2006/0058102 A1 | 3/2006 | Nguyen et al. |
| 2006/0068837 A1 | 3/2006 | Malone |
| 2006/0107081 A1 * | 5/2006 | Krantz et al. ............... 713/300 |
| 2006/0135145 A1 | 6/2006 | Redi |
| 2006/0229083 A1 | 10/2006 | Redi |
| 2007/0070983 A1 | 3/2007 | Redi et al. |
| 2007/0149204 A1 | 6/2007 | Redi et al. |

OTHER PUBLICATIONS

XE-1218-Single Chip Receiver; XEMICS; 2001; pp. 1-8.
Andrew Swaneck; Integrating Passive RF Technology with Cryptographic Communications Protocols; Microchip Technology Inc.; 2000; 7 pages.
Hooman Darabi et al.; An Ultra Low Power 900 MHz CMOS Receiver for Wireless Paging; University of California, Los Angeles; May 17, 1998; pp. 1-33.
Rahul C. Shah; Energy Aware Routing for PicoRadio; Berkeley Wireless Research Center; 39 pages.
Brett Warneke et al.; Ultra-Low Power Communication Logic Circuits for Distributed Sensor Networks; UC Berkeley; 1998; 7 pages.
Brett Warneke; Ultra-Low Power Circuits for Distributed Sensor Networks (Smart Dust); UC Berkeley; (Print Date Jun. 15, 2003); pp. 1-3.
U.S. Appl. No. 10/677,945, Jason Redi.
U.S. Appl. No. 11/895,608, Niky Riga.
U.S. Appl. No. 11/895,527, Basu et al.
Hong et al, "Scalable Routing Protocols for Mobile Ad Hoc Networks," IEEE Network; Jul./Aug. 20002; pp. 11-21.
Lang, "A Comprehensive Overview about Selected Ad Hoc Networking Routing Protocols," Mar. 14, 2003.
Halvardsson et al, "Reliable Group Communication in a Military Mobile Ad Hoc Network," Vaxjo University School of Mathematics and Systems Engineering, Report # 04006, Feb. 2004, pp. 1-52.
Wieselthier et al, "On the Construction of Energy-Efficient Broadcast and Multicast Tress in Wireless Networks," IEE Infocom 2000, 2000, p. 585-594.
Ruppe et al, "Near Term Digital Radio (NTDR) System," IE, 1997, pp. 1282-1287.
Ogier et al, "Topology Dissemination Based on Reverse-Path Forwarding (TBRPF)," Sunsite.dk, Technical Memo, RFC 3684, The Intrnet Society (2004), Feb. 2004, pp. 1-49.
Clausen, et al, "Optimized Link State Routing Protocol (OLSR)," Technical Memo, RFC 3626, The Internet Society (2003), Oct. 2003, pp. 1-6.
Sichitiu et al, "Simple, Accurate Time Synchronization for Wireless Sensor Networks," Proc. IEEE, WCNC pp. 1266-1273 (2003).
Mills, David L., "Internet Time Synchronization: The Network Time Protocol," IEEE Transactions on Communications, 39:10; pp. 1482-1492. (1991).
Ganeriwal et al, "Timing-sync Protocol for Sensor Networks," Proc. ACM SenSys (2003).
Ebner et al, "Synchronization in Ad Hoc Networks Based on UTRA TDD" (2003).
Li et al., Global Clock Synchronization in Sensor Networks, Proc. IEEE Infocom (2004).
Maroti et al., "The Flooding Time Synchronization Protocol," Proc. ACM Sensys. (2004).
Elson et al., "Fine-Grained Network Time Synchronization using Reference Broadcasts," Proc. USENIX OSDI, pp. 147-163 (2002).
Werner-Allen et al, "Firefly-Inspired Sensor Network Synchronicity with Realistic Radio Effects," Proc. ACM Sensys, pp. 142-153 (2005).
Liu et al., "A Bluetooth Scatternet-Route Structure for Multihop Ad Hoc Networks," IEEE J. on Selected Areas in Communications, 21:2(229-39); Feb. 2003.
Salkintzis et al., "Performance analysis of a Downlink MAC Protocol with Power-Saving Support," IEEE Transactions on Vehicular Tech., 49:3(1029-40); May 2000.
Chlamtac et al., "An Energy-Conserving Access Protocol for Wireless Communication," Proc. of Int'l. Conf. on Comm., pp. 1-7 (Jun. 1997).
Office Action dated Jun. 15, 2007, U.S. Appl. No. 10/677,945.
Office Action dated May 7, 2007, U.S. Appl. No. 11/078,257.
Office Action dated Dec. 12, 2007, U.S. Appl. No. 10/677,945.
Tjoa R et al: "Clock drift reduction for relative time slot TDMA-based sensor networks" (Sep. 5, 2004) PIMRC 2004, IEEE, pp. 1042-4047.
Dai H et al: "Tsync: A Lightweight Bidirectional Time Synchronization Service for Wireless Sensor Networks" (Jan. 2004), Mobile Computing and Communications Review, ACM, NY, pp. 125-139, ISSN: 1091-1669.
Ebner A et al: "Decentralized slot synchronization in highly dynamic ad hoc networks" Wireless Personal Multimedia Communications, 2002, IEEE, vol. 2, (Oct. 27, 2002).
Zhijun Shang et al: "A low overhead multi-hop time sync protocol for wireless sensor networks" Networking, Sensing and Control, 2005, IEEE (Mar. 19, 2005), pp. 54-59.
Singh S et al "Power-Aware Routing in Mobile Ad Hoc Networks" Mobicom '98, Proceedings of the 4th Annual ACM/IEEE International Conference on Mobile Computing and Networking, Dallas, TX (Oct. 25-30, 1998) XP000850267, pp. 181-190.

Fan Ye et al "A randomized energy-conservation protocol for resilient sensor networks" Wireless Networks; The Journal of Mobile Communication, Computation and Information, Kluwer Academic Publishers, Do, vol. 12, No. 5, (Apr. 27, 2006) pp. 637-652.

Office Action dated Dec. 10, 2008, U.S. Appl. No. 11/439,320.
Office Action dated Dec. 9, 2008, U.S. Appl. No. 11/347,963.

* cited by examiner

LOW-POWER AD HOC NETWORK ENTRY

TECHNICAL FIELD

The invention relates to the field of communication networks and, more particularly, to systems and methods that allow a low-powered node to join an ad hoc network.

BACKGROUND OF THE INVENTION

Many existing wireless ad hoc networks were built with the assumption that every network node has a free and essentially unlimited power supply. In recent years, researchers have begun to think about battery-powered ad hoc networks. Several groups have begun work on ultra low-power radios suitable for use in low-energy nodes. Such ultra low-power radios have their receivers turned off most of the time because of the receivers' high power requirements. The best ultra low-power radio designs include a receiver that is powered by a small trickle of energy in a kind of "pager mode," such that the receiver can be woken up by an incoming signal and can turn power on to a remainder of the receiver, for example, a processor, a memory, and the like.

Various network research teams have begun to think about how to create energy-conserving ad hoc networking protocols. One example includes scheduling when a given node is to transmit, such that nearby nodes may turn their receivers on at the scheduled time in order to receive the given node's transmission. This type of scheduling approach makes it possible for nodes to keep their receivers in a powered off state for long periods of time, for example, hours or days. As a result, it is difficult for a new node to enter the network because the existing network nodes with powered off receivers will not respond to transmissions from the new node. Consequently, the new node may not be able to learn the schedules used by the existing nodes in the network. An energy-conserving ad hoc network that allows new low-powered nodes to easily enter the network is needed.

SUMMARY OF THE INVENTION

Systems and methods consistent with the principles of the invention facilitate new nodes joining an energy-conserving ad hoc network.

In a first aspect of the invention, a method is provided for a given node to join an ad-hoc network of energy-conserving nodes. The given node may transmit a wake-up signal. The given node may receive, from an energy-conserving node in the network, a message including information sufficient for the given node to determine how to join the network. The given node may join the network using the information.

In a second aspect of the invention, an energy-conserving ad hoc network that includes a group of nodes is provided. The nodes include a transceiver, processing logic, a memory, a bellringer transmitter, and a bellringer receiver. The transceiver is configured to receive and transmit data messages. The memory is configure to store a schedule of reception times. When the node is an existing node in the network, the processing logic is configured to: receive a wake-up signal via the bellringer receiver, and responsive to the receiving of the wake-up signal, transmit, via the transceiver, a message including the schedule of reception times. When the node is a node joining the network, the processing logic is configured to: transmit the wake-up signal; receive the message from an existing one of the nodes in the network, and join the network based on the message.

In a third aspect of the invention, a node that is configured to operate in an energy-conserving ad hoc network is provided. The node includes a transceiver, a transmitter, and processing logic. The transceiver is configured to send and receive data messages. The transmitter is configured to transmit a wake-up signal. The processing logic is configured to control operation of the transceiver and the transmitter. The processing logic is further configured to: transmit the wake-up signal via the transmitter; receive a network entry message from one of a group of existing nodes in the network, the network entry message including scheduled times in which at least one of the existing nodes in the network is available to receive; and join the network using the scheduled times.

In a fourth aspect of the invention, a machine-readable medium is provided. The machine-readable medium has instructions recorded thereon for at least one processor of a node. When the instructions are executed by the at least one processor, the at least one processor is configured to: transmit a wake-up signal when the node intends to join a network; receive a network entry message from an existing node in the network, the network entry message including information regarding availability of at least one network node for receiving a message from the node; and join the network based on the information included in the network entry message.

In a fifth aspect of the invention, a machine-readable medium is provided. The machine-readable medium has instructions recorded thereon for at least one processor of a node. When the instructions are executed by the at least one processor, the at least one processor is configured to: receive a wake-up signal via a bellringer receiver; and responsive to the receiving of the wake-up signal, transmit a network entry message including scheduled times and durations in which one or more of existing network nodes are available to receive.

In a sixth aspect of the invention, a node configured to operate in an energy-conserving ad hoc network is provided. The node includes: means for transmitting a wake-up signal; means for receiving a network entry message from an existing node in the network, the network entry message including sufficient information for the node to join the network; and means for joining the network using the information.

In a seventh aspect of the invention, a node in an ad hoc network is provided. The node includes a memory and a processor. The memory is configured to store one or more time periods during which the node is available to receive. The processor is configured to transmit a first wake-up signal, receive a message from a neighboring node, the message identifying one or more time periods during which the neighboring node is available to receive, store the one or more time periods from the message in the memory, receive a second wake-up signal from a different node, and transmit a message to the different node. The message includes at least the one or more time periods during which the node is available to receive.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Operating Environment

One type of wireless network is known as an "ad-hoc" network. In an ad-hoc network, nodes may cooperatively route traffic among themselves. Network nodes in these networks may not be permanent: they are instead based on physical proximity at any given point in time. The network may adjust dynamically to changing node conditions, which may result from node mobility or failure.

In general, some or all of the nodes in an ad-hoc network are capable of network routing functions ("routers"), while other nodes may be merely source or destinations for data traffic ("endpoints"). All nodes in the network may execute a set of algorithms and perform a set of networking protocols that enable the nodes to find each other, determine paths through the network for data traffic from source to destination(s), and detect and repair ruptures in the network as nodes move, or fail, as battery power changes, and as communication path characteristics change over time.

Figure 1:
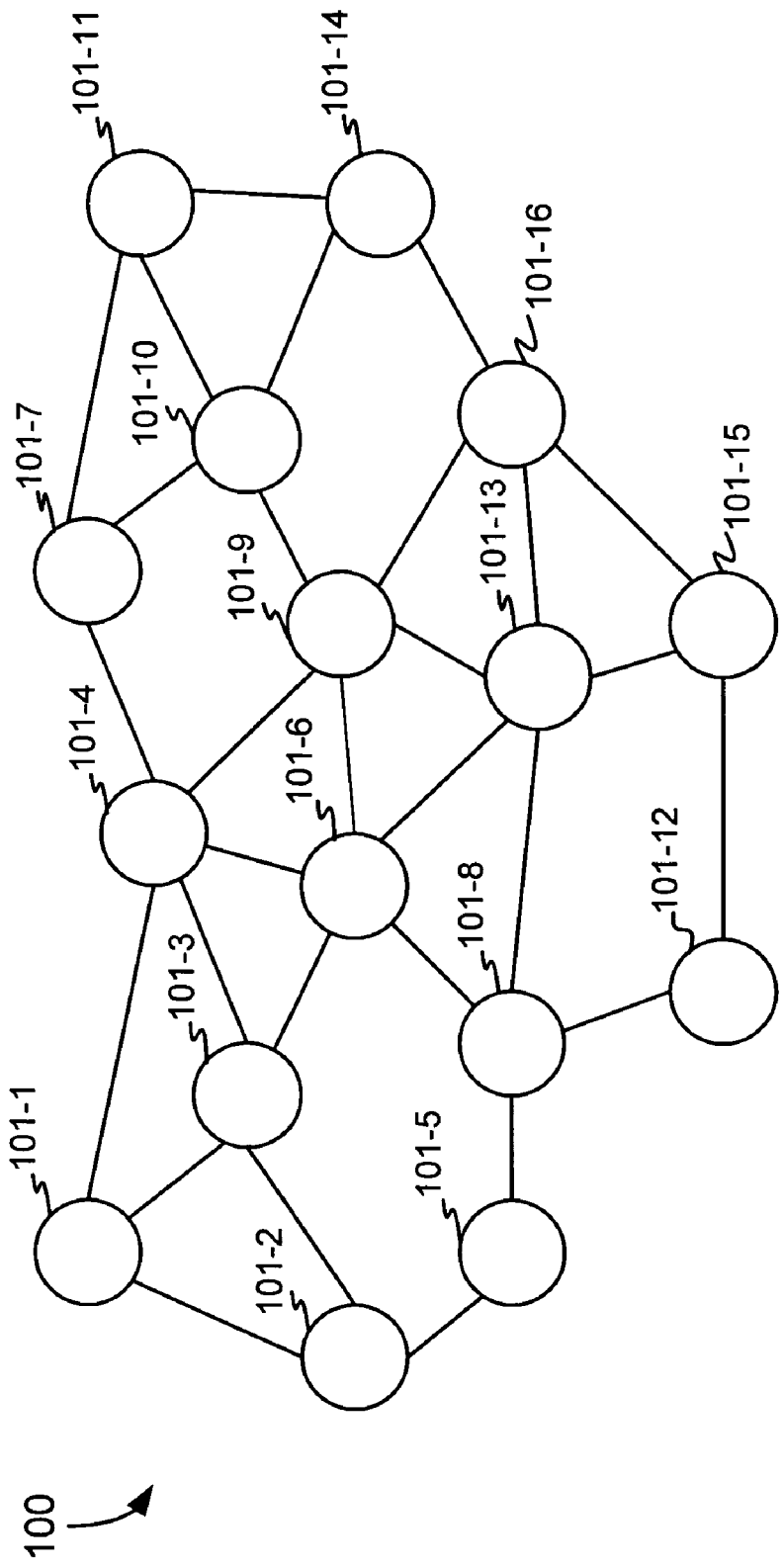
FIG. 1 illustrates an exemplary ad hoc wireless network in which implementations consistent with principles of the invention may operate.

FIG. 1 is a diagram illustrating an exemplary ad-hoc network 100 in which implementations consistent with principles of the invention may operate. Ad-hoc network 100 may include a number of nodes 101-1 through 101-16 (collectively referred to as node 101). Lines joining nodes 101 represent connectivity; that is, if two nodes 101 are connected by a line, the two nodes can communicate directly with one another. A message in network 100 can make its way through the network hop-by-hop until it reaches its destination node.

Exemplary Hardware Configuration

Figure 2:
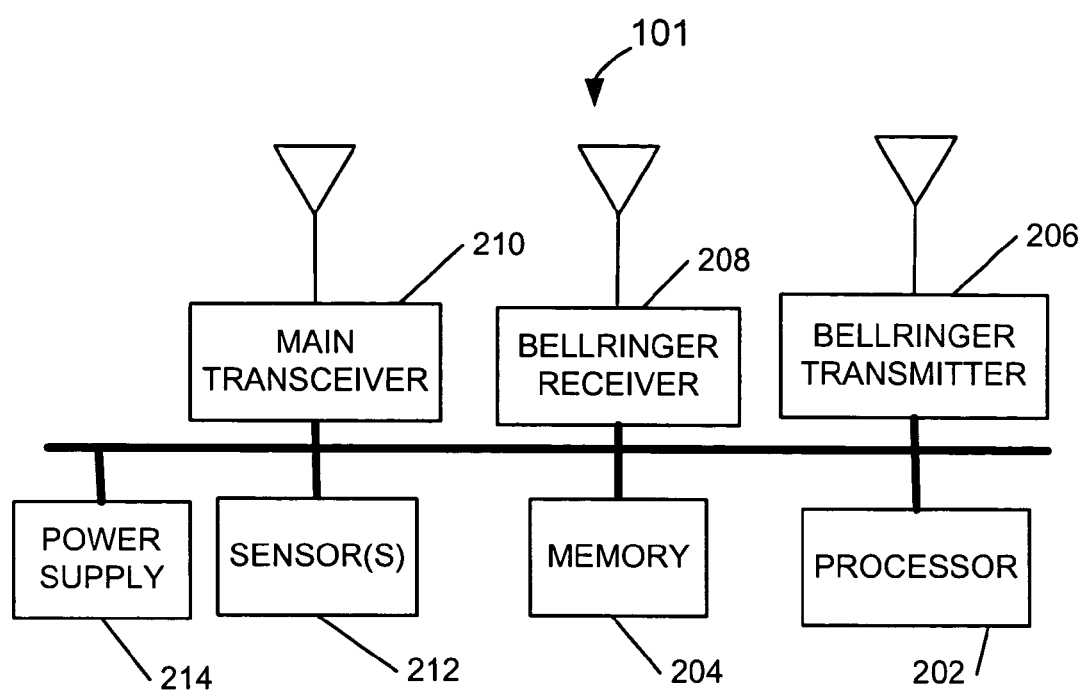
FIG. 2 illustrates, in detail, a node that may be used in the network of FIG. 1.

FIG. 2 illustrates exemplary configuration of node 101 in an implementation consistent with the principles of the invention. Exemplary node 101 may include a processor 202, a memory 204, a beilringer transmitter 206, a bellringer receiver 208, a main transceiver 210, one or more sensors 212, and a power supply 214. Processor 202 may be a conventional microcomputer, micro-controller, Digital Signal Processor (DSP), logic, such as a Field Programmable Gate Array (FPGA) or Application Specific Integrated Circuit (ASIC), or any other device capable of controlling node 101.

Memory 204 may include static memory, such as Nonvolatile Random Access Memory (NVRAM) or flash memory for storing instructions and configuration parameters. Memory 304 may also include Dynamic Random Access Memory (DRAM), or any other convenient form of memory for use as working storage during operation of node 101.

Bellringer transmitter 206 may be a separately powered transmitter that is configured to transmit a signal that may "wake-up" nearby nodes. Bellringer transmitter 206 may not transmit actual data bits, but, instead, may jolt a nearby node so that the nearby node may apply power to, for example, its main transceiver 210, processor 202, memory 204, etc.

Bellringer receiver 208 may be an energy-efficient receiver that can detect an incoming "wake-up" from a transmitter, such as, for example, bellringer transmitter 206 of another node, and can power on the remainder of bellringer receiver 208, the receiving node's processor 202, memory 204, etc. Such a receiver may be built using, for example, a XE1218 single chip low-power VHF receiver, available from Xemics USA Inc., of Mountain View, Calif. or any other suitable low-power receiver chip. Once a node has joined the network, the node may apply a thin trickle of power to its bellringer receiver 208. Some implementations of bellringer receiver 208 may not require any internal power supply, but, instead, may be powered by ambient radio frequency (RF) power, similar to a way in which old "cat's whisker" or crystal radios were powered.

Main transceiver 210 may be capable of modulating messages via radio frequency (RF) over a wireless channel. In one implementation, main transceiver 210 may include a transmit modem and may perform such functions as converting bits to chips, inserting preambles (for example, to provide synchronization patterns for a receive modem), adding error correction features, such as Forward Error Correction codes, and providing power level indications. Main transceiver may include a Code Division Multiple Access (CDMA) transmitter, that is capable of converting narrow band signals to chips, or wider band signals by multiplying each complex single bit symbol by a time-varying complex spreading code sequence.

Main transceiver 210 also may be capable of demodulating messages received by an antenna. In one implementation, main transceiver 210 may include a receive modem and may perform functions, such as detection of synchronization preambles, Viterbi decoding, and application of error codes.

In various implementations consistent with the principles of the invention main transceiver 210 may be capable of sending and receiving messages via a number of media, including, for example, RF communications, optical communications, and acoustic communications, as well as others.

Sensors 212 may optionally be provided for sensor network nodes. Sensors 212 may include video sensors, for still or moving images, acoustic sensors, magnetic sensors, or other types of sensors. An ad hoc wireless sensor network may, for example, be used to gather environmental data for a particular area in which the nodes are placed.

Power supply 214 may be provided to power node 101. Power supply 214 may include, for example, one or more batteries, solar collectors, and ambient energy scavengers.

Node 101, as illustrated in FIG. 2, may include a number of antennas (e.g., bellringer transmitter 206, bellringer receiver 208, and main transceiver 210 may be associated with a separate antenna, as illustrated in FIG. 2); however, in some implementations, some antennas may be combined. In one implementation, some or all of main transceiver 210, bellringer transmitter 206, and bellringer receiver 208 may include shared parts, may be a single combined module, may be multiple combined modules, or may be a combination of one or more combined modules with one or more modules that are not combined.

Exemplary Operation

Figure 3:
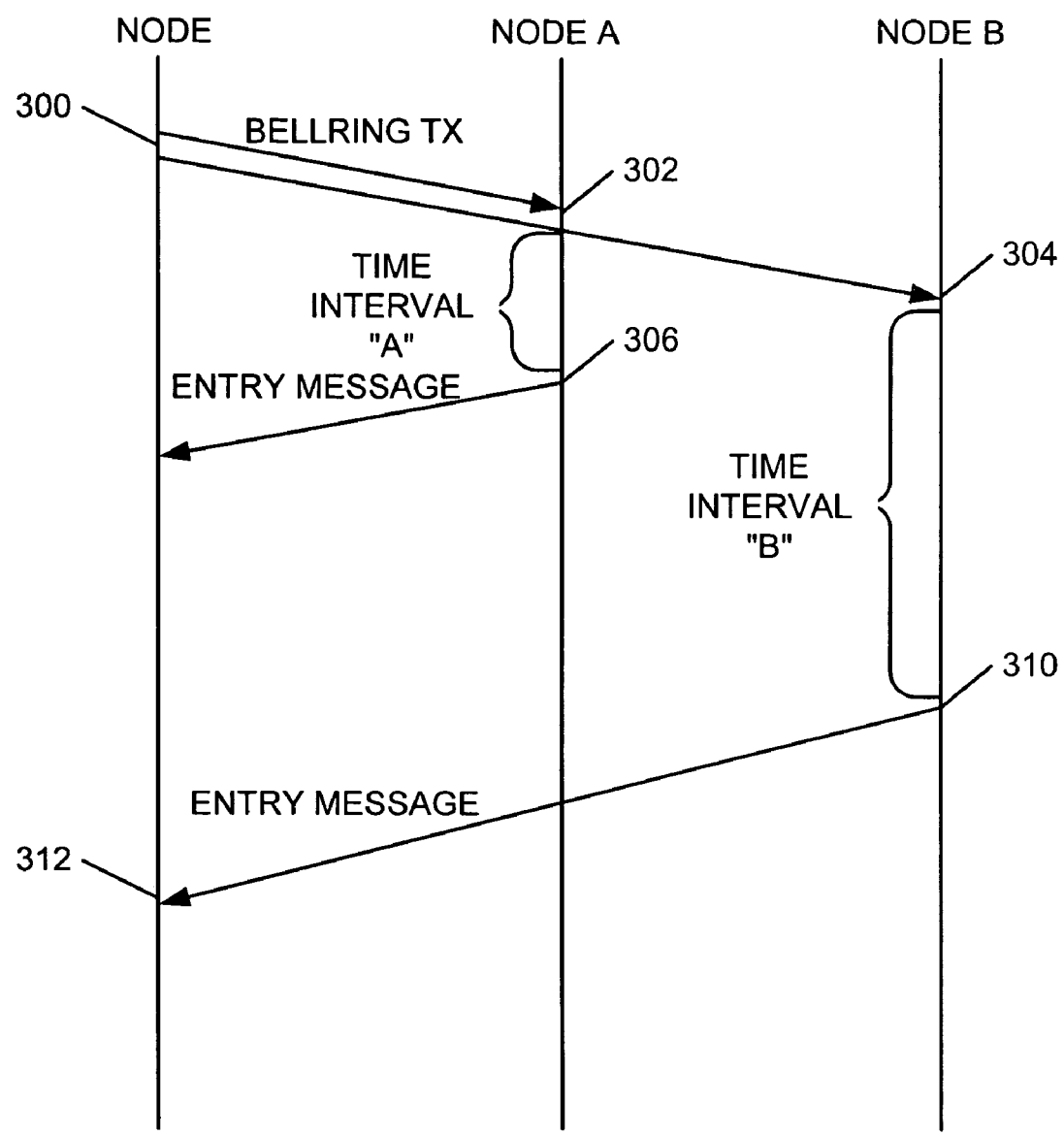
FIG. 3 provides an example, consistent with the principles of the invention, of a new node joining a network.

FIG. 3 illustrates exemplary operation of a node attempting to join an energy-conserving ad hoc network in a manner consistent with the principles of the invention. The node may send a "wake-up" signal via a transmitter, such as, for example, bellringer transmitter 206 (300). Assume for exemplary purposes, that two nodes, nodes A and B are near the node attempting to join the network. Nearby nodes A and B may receive the transmission via their respective receivers, such as, for example, bellringer receivers 208. The "wake-up" signal may cause nodes A and B to "wake-up" (i.e., to power up the remainder of bellringer receiver 208, processor 202, memory 204, etc.) (302, 304). Node A may wait for a time interval "A" and node B may wait for a time interval "B" and, respectively, transmit a "network entry message" to the node (306, 310) informing the node how to join the network. The "network entry message" may include scheduling information, as will be described below. Time intervals "A" and "B" may be chosen, such that nodes A and B do not transmit at the same time because such a simultaneous transmission may garble both "network entry messages" causing the messages not to be properly received by the node. These intervals may be chosen in a probabilistic or deterministic fashion. The node may receive one or more of the "network entry messages" (308, 312) and determine how to join the network.

Exemplary Processing of New Node in Network

Figure 4A:
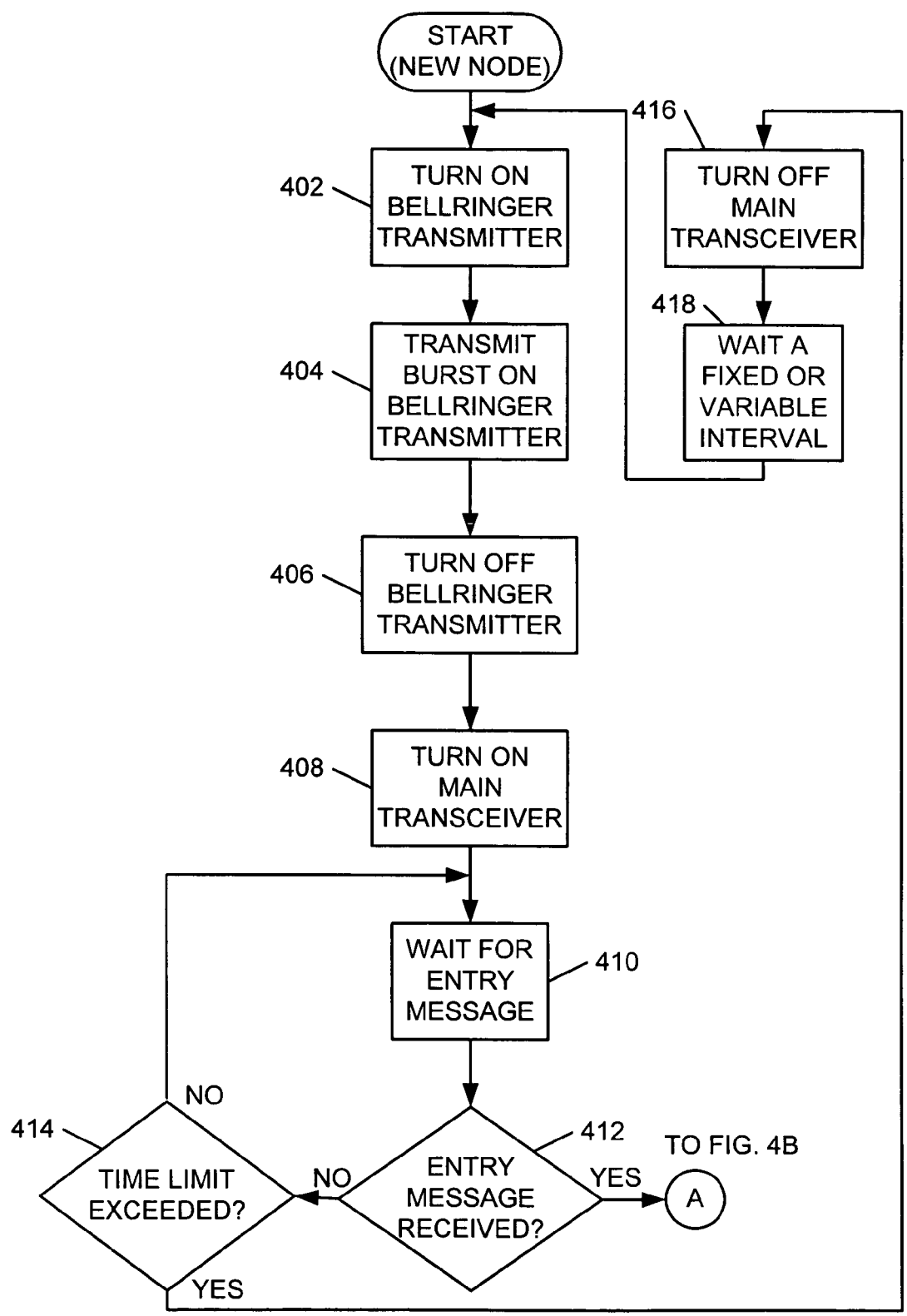
FIGS. 4A and 4B are flowcharts that illustrates exemplary processing logic of a new node attempting to join a network.
Figure 4B:
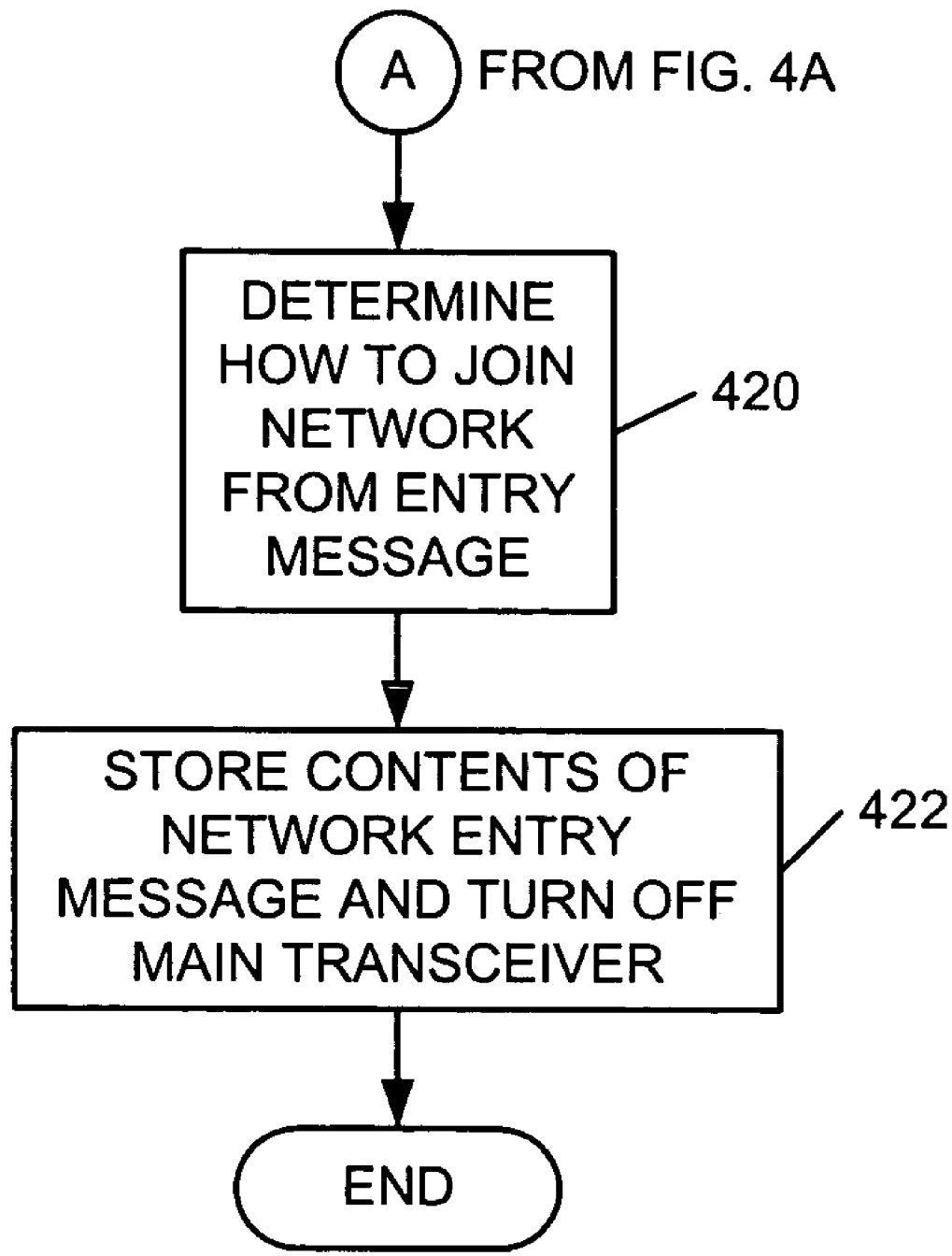

FIGS. 4A and 4B illustrate exemplary processing that may be implemented in a node consistent with the exemplary operation illustrated in FIG. 3. Node 101 may begin by powering on bellringer transmitter 206 (act 402: FIG. 4A) and transmitting a "wake-up" burst or signal via bellringer transmitter 206 (act 404). Node 101 may then power off bellringer transmitter 206 (act 406) and power on main transceiver 210 (act 408) in order to receive responses from nearby nodes. Node 101 may then wait for reception of a "network entry message" (act 410).

If node 101 determines that no "network entry message" was received (act 412), then node 101 may determine whether a time limit was exceeded (act 414). The time limit may be, for example, one minute or any other suitable amount of time. If no time limit was exceeded, then processing may proceed to act 410 to wait for reception of a "network entry message." If node 101 determines that a time limit was exceeded (act 414), then node 101 may turn off main transceiver 210 (act 416) and wait a fixed or variable time interval (act 418). Processing may then proceed to act 402 to turn on bellringer transmitter 206 and repeat the process described above.

If node 101 determines that an entry message was received (act 410), then node 101 may examine contents of the "network entry message" to determine how to join the network (act 420: FIG. 4B). As will be described in greater detail below, the "network entry message" received from a node may include a channel and a corresponding time at which the node is available to receive messages. Node 101 may then store the contents of the "network entry message" and power off main transceiver 210 (act 422). Node 101 may use the contents of the "network entry message" to determine when one or more other nodes are available to receive and may transmit a message to the one or more other nodes at an appropriate time in order to join the network.

The time limit of act 414 and the "fixed or variable interval" of act 418 may be implemented in numerous ways. For example, in some implementations, the time limit and/or the "fixed or variable interval" may be fixed at, for example, a few seconds, such as, four seconds, and in other implementations, the time limit and/or the "fixed or variable interval" may be variable. In some implementations, the "fixed or variable interval" may begin with a short interval, such that a repetition rate may be short, for example, one minute. As a number of failed attempts to receive a "network entry message" increases, node 101 may increase the length of the "fixed or variable interval" to slow down the repetition rate.

Exemplary Processing of Existing Node in Network

Figure 5:
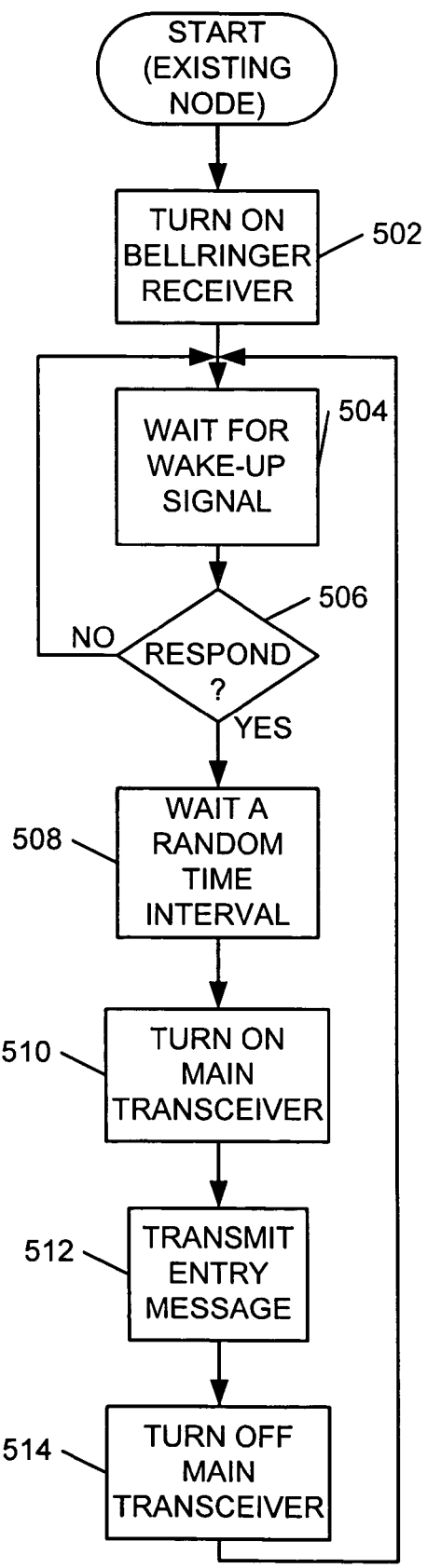
FIG. 5 is a flowchart that illustrates exemplary processing logic of an existing network node.

FIG. 5 illustrates exemplary processing that may be implemented in existing nodes in the network, consistent with the exemplary operation illustrated in FIG. 3. Existing node 101 may begin by powering on a receiver, such as, for example, bellringer receiver 208 (act 502) so that existing node 101 may respond to a received "wake-up" signal, which may be from another node's bellringer transmitter 206. Bellringer receiver 208 may remain powered on indefinitely or, alternatively, may be powered on for only some portions of time. Existing node 101 may then wait for the "wake-up" signal (act 504). When existing node 101 receives the "wake-up" signal, existing node 101 may determine whether to respond to the "wake-up" signal (act 506).

The decision to respond may be implemented in a number of different ways. For example, in one implementation, existing node 101 may always respond to the "wake-up" signal. In a second exemplary implementation, the decision may be random. The second implementation may be suitable for a fairly dense network because a number of nodes that may attempt to respond to the "wake-up" signal may be reduced. In a third exemplary implementation, the decision to respond may be based on a received signal strength of the received "wake-up" signal, as determined by bellringer receiver 208. Using this approach, distant nodes may be less likely to respond to the "wake-up" signal. In a fourth exemplary implementation, the decision to respond may depend on an existing node's understanding of current network density. In this implementation, an existing node 101 having a large number of nearby neighbors may be less likely to respond. In a fifth exemplary implementation, the decision to respond may be shift based. That is, some existing nodes 101 may respond during certain time periods or shifts, while other existing nodes 101 may respond during other time periods or shifts. There are many other possible approaches that may be implemented in existing node 101 for making the decision to respond. The above implementations are exemplary and are not intended to limit the implementations only to these approaches.

If existing node 101 decides not to respond, then processing may return to act 504 to wait for another "wake-up" signal. Otherwise, existing node 101 may wait for a random time interval (act 508). In some implementations, the random time interval may be chosen from a range. For example, the random time interval may be chosen from uniformly distributed values in a range of 0-5 seconds. In other implementations, the random time interval may be chosen from a different random distribution, for example, an exponential distribution. Any number of methods for generating a random time interval may be used as long as the method makes it unlikely that different nodes 101 will transmit "network entry messages" at overlapping times, thereby causing the "network entry messages" to be garbled at the node 101 wishing to join the network.

Next, existing node 101 may power on main transceiver 210 (act 510) and may transmit a "network entry message" (act 512). Existing node 101 may then power off main transceiver 210 (act 514). Processing may then proceed to act 504 to wait for the "wake-up" signal from a node 101.

Exemplary "Network Entry Message"

Figure 6:
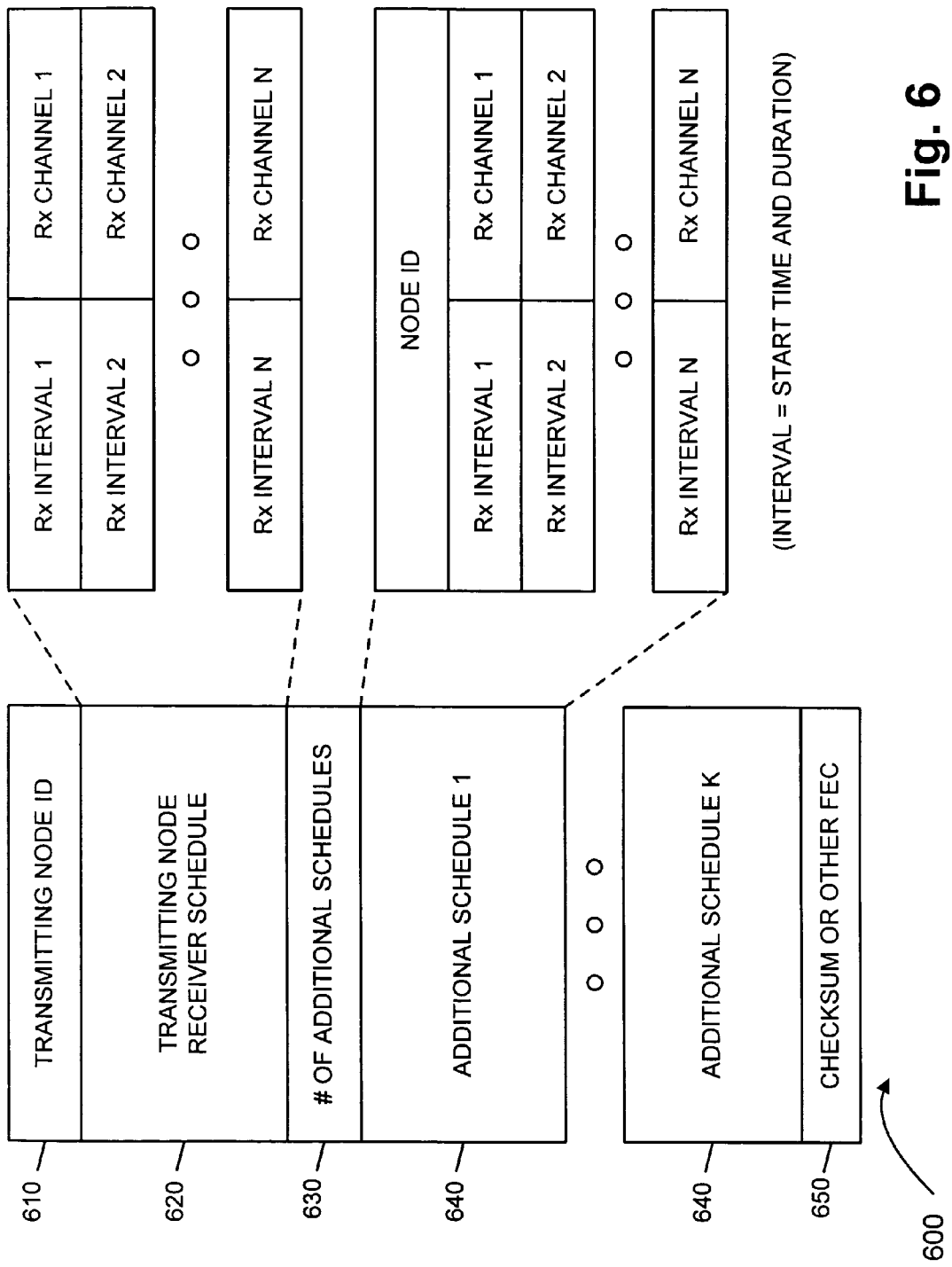
FIG. 6 illustrates, in detail, contents of an exemplary network entry message that may be used in implementations consistent with the principles of the invention.

In general, a "network entry message" will provide sufficient information to a node 101, such that node 101 may properly join the existing network. The "network entry message" may take a variety of forms. FIG. 6 shows one exemplary form for the "network entry message."

In FIG. 6, exemplary "network entry message" 600 can include a transmitting node identification (ID) field 610, as well as a transmitting node receiver schedule field 620. Transmitting node ID field 610 may store an identifier of the node transmitting "network entry message" 600. Transmitting node receiver schedule 620 may include N reception definitions, each reception definition including a reception interval (i.e., a start time and a duration for which the node identified in transmitting node ID field 610 will be powered on and available to receive messages) and a reception channel (i.e., a carrier frequency). Additionally, the exemplary receiver schedule message 600 can optionally include an additional schedule count field 630, additional pending receiver schedule fields 640, and an error correction field 650.

Additional schedule count field 630 can indicate a number, if any, of additional pending receiver schedule fields 640 to follow. As shown, each additional pending receiver schedule 640 can include a node identification field, identifying another node in the network, and an associated collection of N reception definitions (each definition in turn including an associated interval and channel). Error correction field 650 can include information to ensure accurate transmission of the "network entry message" 600. Note also that "network entry message" 600 can be encrypted using known techniques to provide added security (e.g., network nodes can use a shared encryption key to code and decode messages as they are transmitted and received).

Thus, a node 101 receiving a "network entry message," such as exemplary "network entry message" 600, may determine how to join the existing network from the received one or more schedules in "network entry message" 600. For example, existing node 101 may transmit a message to one or more existing nodes during their scheduled receive intervals, using a scheduled channel, to facilitate joining the network. In other implementations, the "network entry messages" may be tagged with other fields, such as a list of specific nodes allowed to transmit during a given time, or may be tailored to specific uses, such as time intervals that are dedicated to messages from new network entrants.

Modifications and Variations

Certain portions of the invention may be implemented as "logic" that performs one or more functions. This logic may include hardware, such as an application specific integrated circuit or a field programmable gate array, software, or a combination of hardware and software.

CONCLUSION

Systems and methods consistent with the principle of the invention allow a node to easily join an existing network of energy-conserving nodes. According to exemplary embodiments, the node can transmit a "wake-up" signal via a transmitter, such as a bellringer transmitter. The existing nodes may keep their respective receivers, for example, bellringer receivers, powered on in a low-power mode, such that a transmitted "wake-up" signal can be detected. If an existing node detects a "wake-up" signal, the existing node may wait a random time interval, may power on a main transceiver and may transmit a "network entry message" to the node to thereby, provide the node with sufficient information to join the existing network.

The foregoing description of preferred embodiments of the invention provides illustration and description, but is not intended to be exhaustive or to limit the invention to the precise form disclosed. Modifications and variations are possible in light of the above teachings or may be acquired from practice of the invention for example, while a series of acts have been described with regard to FIGS. 4A-5, the order of the acts may differ in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. An energy-conserving ad hoc network including a plurality of nodes, each of the nodes comprising:
    a transceiver configured to receive and transmit data messages;
    processing logic;
    a memory configured to store a schedule of reception times;
    a bellringer transmitter; and
    a bellringer receiver, wherein:
    when the node is an existing node in the network,
        the processing logic is configured to:
            receive a wake-up signal via the bellringer receiver, and
            responsive to the receiving of the wake-up signal, transmit, via the transceiver, a message including the schedule of reception times,
    when the node is a node joining the network,
        the processing logic is configured to:
            transmit the wake-up signal,
            receive the message from an existing one of the nodes in the network, and
            join the network based on the message.

2. The energy-conserving ad-hoc network of claim 1, wherein when the node is an existing node, the processing logic of the node is further configured to wait a random time interval before responding to the wake-up signal.

3. The energy-conserving ad hoc network of claim 1, wherein when the node is an existing node, the processing logic further is configured to determine whether to respond to the received wake-up signal based on one of a random decision, a received signal strength of the wake-up signal, a current density of the network from a point of view of the existing node, and one or more certain time periods during which the existing node is configured to respond to the received wake-up signal.

* * * * *